(No Model.)

J. B. MAHAFFEY.
WOOD PLANING MACHINE.

No. 510,693. Patented Dec. 12, 1893.

-WITNESSES-
Dan'l Fisher
George Hemsley

-INVENTOR-
James B. Mahaffey,
by W. T. Howard,
attys.

UNITED STATES PATENT OFFICE.

JAMES B. MAHAFFEY, OF BALTIMORE, MARYLAND, ASSIGNOR OF ONE-HALF TO EBEN B. HUNTING, OF SAME PLACE.

WOOD-PLANING MACHINE.

SPECIFICATION forming part of Letters Patent No. 510,693, dated December 12, 1893.

Application filed April 26, 1893. Serial No. 471,861. (No model.)

*To all whom it may concern:*

Be it known that I, JAMES B. MAHAFFEY, of the city of Baltimore and State of Maryland, have invented certain Improvements in Wood-Planing Machines, of which the following is a specification.

This invention relates to the combination with a cutter head of a wood planing machine, of a curved cutter or knife of uniform thickness, the hollow face of which is applied to the head and the device held thereto by means of bolts and nuts as will hereinafter fully appear.

In the description of the said invention which follows, reference is made to the accompanying drawings forming a part hereof and in which—

Figure 1:
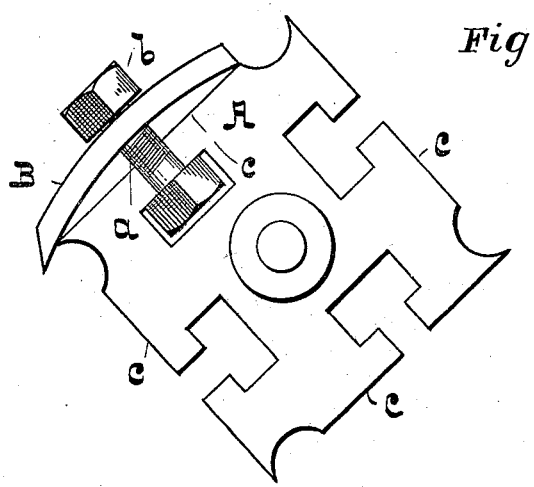
Figure 2:
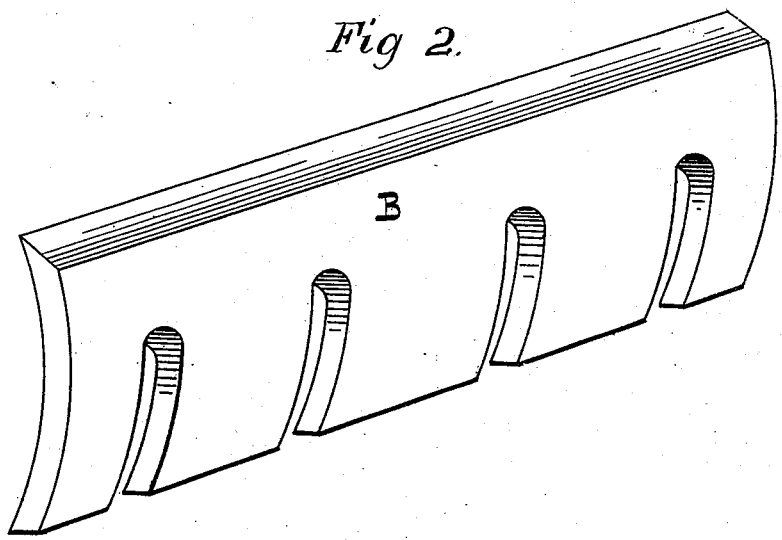

Figure 1 is an end view of a cutter head provided with a cutter in accordance with the present invention. Fig. 2 is a perspective view of the cutter alone.

Referring to the drawings, A is the cutter head which is rectangular in shape and of ordinary construction, and B a cutter or knife secured to the head A by means of bolts $a$ and nuts $b$. Only one cutter is shown but it will be understood that each face of the head is provided with a cutter corresponding in shape to the one shown. The faces $c$ of the head A are flat, and the cutter has a hollow under and a rounded outer surface, and it is of uniform thickness throughout.

When the cutter is applied to the head as shown, it will be seen that it bears on two points only, and is held in contact with these points by the nut $b$ which touches only the crown of the arch formed by the cutter. With this arrangement, the cutter or knife is firmly held in position and at the same time it resists change in shape.

I am aware that it is not new to use in connection with a cutter head, a curved knife, but I am not aware that before my invention thereof, a curved knife or cutter of uniform thickness, had been applied to the flat face of a head, so that it bears on two points only as shown and described.

I claim as my invention—

In combination with a cutter head having a practically flat face, a cutter having a hollow and a rounded side, and of practically uniform thickness throughout, the hollow side of the cutter being applied to the flat face of the cutter head and secured thereto by means of bolts, substantially as, and for the purpose specified.

JAMES B. MAHAFFEY.

Witnesses:
WM. T. HOWARD,
GEO. E. TAYLOR.